US006952082B2

(12) United States Patent
Schmitkons et al.

(10) Patent No.: US 6,952,082 B2
(45) Date of Patent: Oct. 4, 2005

(54) MICROWAVE EXCITED ULTRAVIOLET LAMP SYSTEM WITH SINGLE ELECTRICAL INTERCONNECTION

(75) Inventors: James W. Schmitkons, Lorain, OH (US); Carl A. Bretmersky, Olmsted, OH (US); Jay Wolf, Avon, OH (US)

(73) Assignee: Nordson Corporation, Westlake, OH (US)

( * ) Notice: Subject to any disclaimer, the term of this patent is extended or adjusted under 35 U.S.C. 154(b) by 68 days.

(21) Appl. No.: 10/764,929

(22) Filed: Jan. 26, 2004

(65) Prior Publication Data

US 2004/0155591 A1 Aug. 12, 2004

Related U.S. Application Data

(60) Provisional application No. 60/444,307, filed on Jan. 31, 2003.

(51) Int. Cl.[7] .......................... G06F 19/00; H05B 37/02; H05B 39/00

(52) U.S. Cl. ......................... 315/149; 315/106; 315/150; 315/151

(58) Field of Search ................................ 315/112, 106, 315/149, 150, 151; 307/33, 31

(56) References Cited

U.S. PATENT DOCUMENTS 4,985,313 A * 1/1991 Penneck et al. ............ 428/627
6,265,830 B1 * 7/2001 Bretmersky et al. ........ 315/106
6,577,074 B1 * 6/2003 Ervin et al. ................. 315/248
6,828,696 B2 * 12/2004 Barry et al. .................. 307/33
2002/0084695 A1 * 7/2002 Penzenstadler et al. ....... 307/31
2003/0122501 A1 * 7/2003 Ervin et al. ................. 315/248

OTHER PUBLICATIONS

Fusion Systems Corporation, F300S Ultraviolet Lamp System Installation, Operation and Maintenance Manual, Manual No. 341701 Rev E date Aug. 1995.*

Fusion Systems Corporation, *F300S Ultraviolet Lamp System Installation, Operation and Maintenance Manual*, Manual No. 341701 Rev E dated Aug. 1995 (104 pages).

* cited by examiner

*Primary Examiner*—Don Wong
*Assistant Examiner*—Hung Tran Vy
(74) *Attorney, Agent, or Firm*—Wood, Herron & Evans, L.L.P.

(57) ABSTRACT

A microwave excited ultraviolet lamp system having a single electrical cable that supplies operating voltages from a power supply to a lamp head. The single electrical cable may provide high voltage to a magnetron of the lamp head and a lesser voltage to an internal blower of the lamp head. The electrical cable may incorporate conductors for transferring communications signals between the power supply and sensors associated with the lamp head.

17 Claims, 1 Drawing Sheet

MICROWAVE EXCITED ULTRAVIOLET LAMP SYSTEM WITH SINGLE ELECTRICAL INTERCONNECTION

CROSS REFERENCE TO RELATED APPLICATIONS

This application claims the benefit of U.S. Provisional Application No. 60/444,307, filed Jan. 31, 2003, the disclosure of which is hereby incorporated by reference herein in its entirety.

FIELD OF THE INVENTION

The present invention relates generally to power supplies and, more particularly, to a power supply and method for controlling the filament voltage in a magnetron.

BACKGROUND OF THE INVENTION

In lamp heating and curing applications, one or more magnetrons are used to provide microwave radiation to a lamp source, such as an electrodeless ultraviolet (UV) lamp used in the curing of adhesives, sealants or coatings in industrial applications. When the plasma of the lamp is sufficiently excited by the microwave radiation from each magnetron, the lamp illuminates to provide the necessary light wavelength and intensity for the particular heating or curing process.

Microwave-excited lamp systems typically have a separate power supply that provides high voltage to each magnetron and a lesser voltage to a blower and each magnetron filament. The power supply may further be coupled electrically with sensors positioned within the system and the system lamp head. As a result, multiple cables extend from the power supply to the lamp head. For example, a conventional dual-magnetron lamp system includes a high voltage cable extending from the power supply to the magnetrons and a low voltage cable extending from the power supply to the magnetron filaments and an internal blower used to cool the lamp head. In conventional single-magnetron systems with an internal blower, the lamp system includes a single high voltage cable energizing the magnetron and a single low voltage cable for energizing the blower and magnetron filament. Conventional microwave-excited lamp systems may also include a cable for transmitting signals between the power supply and system sensors.

Regardless of the specific cabling configuration, conventional microwave-excited lamp systems require multiple cables that extend from the power supply to the lamp head, which increases the complexity of electrically coupling the power supply with the lamp head. In addition, any one of the multiple cables may be unintentionally disconnected from either the power supply or lamp head. The likelihood of such an unintentional disconnection increases with the number of cables. Moreover, the lamp system must perform error checking to verify whether the multiple cables are connected. The error checking may be software and hardware based. In two magnetron systems, the cables coupling the power supply with the lamp head may incorporate conductors for verifying electrical continuity of the cables to the magnetrons.

Thus, there is a need for a microwave-excited ultraviolet lamp system in which the power supply is not coupled with the lamp head by multiple cables.

SUMMARY OF THE INVENTION

The present invention overcomes the foregoing and other shortcomings and drawbacks of power supplies and methods heretofore known for electrically coupling a power supply with a microwave-excited ultraviolet lamp system. While the invention will be described in connection with certain embodiments, it will be understood that the invention is not limited to these embodiments. On the contrary, the invention includes all alternatives, modifications and equivalents as may be included within the spirit and scope of the present invention.

According to the principles of the invention, a lamp system is provided for generating ultraviolet radiation. The lamp system includes a power supply, a lamp head including a lamp capable of generating ultraviolet radiation when energized by microwave energy, and a single cable electrically coupling the power supply with the lamp head.

The power supply and method of the present invention are particularly adapted to simplify the electrical interconnection between the power supply and lamp head of a lamp system. Reducing the number of cables decreases the likelihood of an unintentional disconnection since the status of only a single cable must be verified. Moreover, error checking is simplified because only one cable must be checked, rather than the multiple cables of conventional lamp systems. Installation of the lamp system is simplified because only a single cable need be connected between the power supply and lamp head. For applications in which multiple lamp systems share floor space, reducing the number of cables provides additional benefits.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENT

Figure 1:
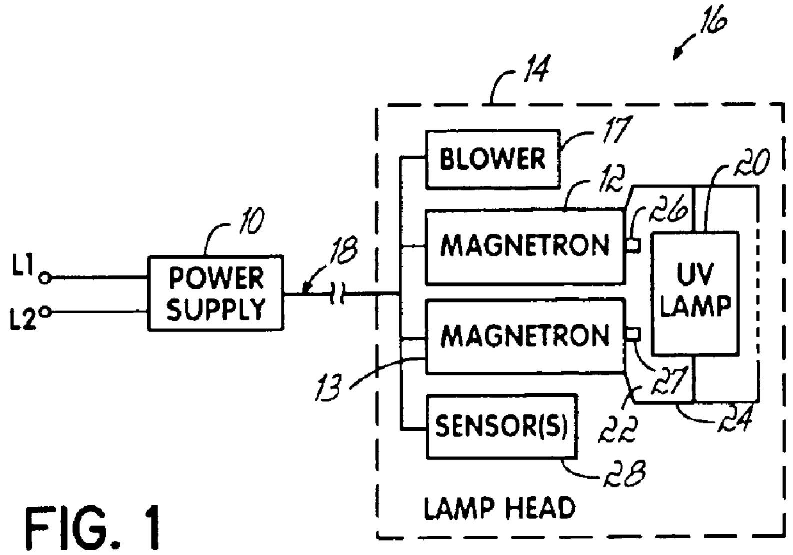
FIG. 1 is a block diagram of a lamp heating or curing system incorporating an electrical cable in accordance with the principles of the invention for supplying operating voltages from a high voltage power supply to a pair of magnetrons and a blower of the system.

With reference to FIG. 1, a power supply 10 is operative for supplying operating voltages to a pair of magnetrons 12, 13 mounted in a lamp head 14 of a lamp heating or curing system, shown generally as 16, and to a blower 17 mounted for directing a forced flow of air to cool the lamp head 14. Power supply 10 is mounted remotely from the magnetrons 12, 13 and is electrically connected to the magnetrons 12, 13 through an elongated electrical cable 18 that may have a length of twenty-five feet or more. The power supply 10 and lamp head 14 each incorporate a bulkhead electrical connector (not shown) compatible with electrical cable 18 for creating respective electrical connections of circuitry inside the power supply 10 with electrical cable 18 and of components of the lamp head 14 with electrical cable 18. The bulkhead electrical connectors each have multiple electrical contacts arranged in a pattern suitable for establishing electrical continuity with the conductors of electrical cable 18.

Power supply 10 is preferably connected to power lines L1 and L2 for receiving AC line voltage at its input, and supplies the necessary operating voltages at its output to magnetrons 12, 13 for generating microwave energy, as is known by those of ordinary skill in the art, and to blower 17. Blower 17 provides a constant exchange of cool air for heated air within the enclosure of the lamp head 14 and reduces maintenance otherwise caused in the event of overheating of the lamp head 14. Those skilled in the art would recognize that microwave-excited ultraviolet lamp systems, such as lamp system 16, generate significant amounts of heat that must be eliminated to avoid unacceptably high operating temperatures.

The microwave energy from the magnetrons 12, 13 is coupled to a lamp 20 (FIG. 1), such as an electrodeless ultraviolet (UV) light source, located within a cavity 22 (FIG. 1) of an enclosure 24. When the plasma of lamp 20 is sufficiently excited by the microwave energy from magnetrons 12, 13, the lamp 20 illuminates to provide the necessary light wavelength and intensity for the particular heating or curing process. For example, lamp system 16 may be a UV light system used in the curing of adhesives, sealants or coatings in industrial applications, or any other heating or curing process that requires light of a particular wavelength and intensity to achieve the desired heating or curing result.

Power supply 10 is operative for providing high voltage DC power over electrical cable 18 to the anode of the magnetrons 12, 13, regulated AC power over electrical cable 18 to a filament 26 of the magnetron 12 and a filament 27 of magnetron 13, and regulated low-voltage AC power over electrical cable 18 to blower 17. In addition, electrical cable 18 incorporates conductors for transmitting low-voltage control and sensor signals between power supply 10 and lamp head 14. For example, lamp head 14 includes various different sensors 28, such as light detectors that sense the presence of output from the lamp 20 and pressure sensors that provide feedback signals to the power supply 10 for ensuring proper operation of the lamp system 16. The invention contemplates that the blower 17 may be a separate unit from the lamp head 14 that provides a flow of cooling air to an inlet of the lamp head 14 and that is powered by a power source other than power supply 10.

Figure 2:
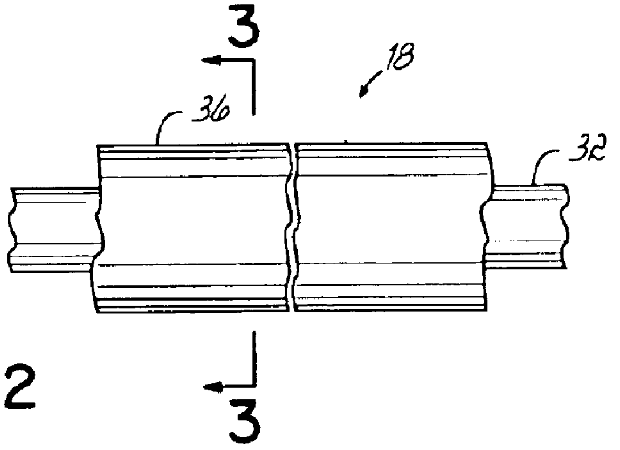
FIG. 2 is a view of the electrical cable of FIG. 1.
Figure 3:
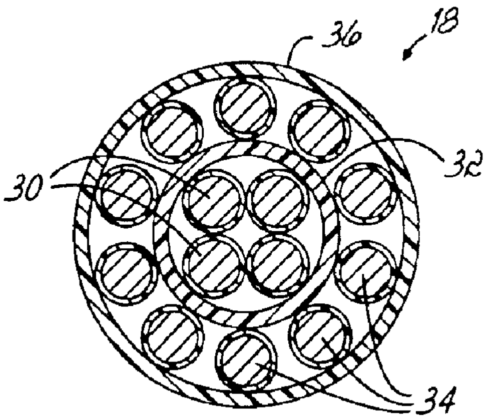
FIG. 3 is a cross-sectional view of the electrical cable taken generally along line 3—3 of FIG. 2.

With reference to FIGS. 2 and 3, the electrical cable 18 includes a plurality of, for example, four inner conductors 30 located inside of an inner electrostatic shield 32, a plurality of, for example, ten outer conductors 34 located inside an outer electrostatic shield 36, and a pair of electrical connectors (not shown) having electrical contacts capable of being coupled electrically with electrical contacts of the bulkhead connectors on the power supply 10 and lamp head 14, respectively. One of the electrical connectors is coupled to one end of conductors 30, 34 and shields 32, 36 and the other of the electrical connectors is coupled to the opposite end of conductors 30, 34 and shields 32, 36. The electrical connectors may be metal sheath connectors such that the entire length of the electrical cable 18 is shielded.

Inner electrostatic shield 32 is grounded for isolating the inner conductors 30 from the outer conductors 34 so as to minimize limit adverse affects of electromagnetic interference (EMI). Similarly, outer electrostatic shield 36 is grounded for isolating the outer conductors 34 from the external environment of electrical cable 18. In effect, the inner conductors 30 are redundantly or doubly shielded against EMI.

An outer jacket of polyvinyl chloride (PVC) or the like may be provided radially outward of the outer electrostatic shield 36. Each of the individual conductors 30, 34 is encased in an outer polymer jacket to provide interconductor electrical isolation. In one embodiment each of the individual conductors 30, 34 are 30 gauge wires. The electrostatic shields 32, 36 may be a composite structure constituted by a braided conductor and a radially-inward aluminized MYLAR® covering.

The inner conductors 30 provide high voltage for energizing the magnetrons 12, 13 and must be capable of carrying, typically, high DC voltages of less than about 10 kV and, typically, between about 4 kV and about 6 kV. Two of the inner conductors 30 represent high voltage leads to corresponding ones of the magnetrons 12, 13 and one of the inner conductors 30 is a ground and return path common to both magnetrons 12, 13. The outer conductors 34 provide conductive paths for providing AC power of relatively lesser voltage to energize the blower 17, to energize the filaments 26, 27, and to transmit control signals between power supply 10 and sensors 28. The outer conductors 34 may be capable of carrying AC voltages of less than about 300 V. However, it is appreciated that individual ones of the outer conductors 34 may carry different voltages. For example, 240 VAC may be provided to blower 17 over one hot conductor 34, 240 VAC may be provided to filaments 26, 27 over two hot conductors 34, another conductor 34 may provide a common ground for the 240 VAC, and the remaining conductors 34 may carry signals to sensors 28 at voltages of 24 VAC or less. The power provided on the outer conductors 34 may be switched by power supply 10.

Any of the individual inner conductors 30 or individual outer conductors 34 may be replaced by a space filler (not shown) of similar dimensions if those particular conductors are unneeded for providing electrical connections between power supply 10 and lamp head 14. The space filler serves as an aid in the packing of the conductors 30 or conductors 34. For example, in the illustrated dual magnetron system, because only two of the inner conductors 30 are carrying voltage, the remaining two conductors 30 may remain unused or may be replaced by a space filler.

The invention contemplates that lamp head 14 may include a single magnetron 12 for exciting lamp 20. Electrical cable 18 may also be used on a single magnetron lamp system without alteration as only certain inner conductors 30 will be powered and other inner conductors 30 will remain unused. Electrical cable 18 may, therefore, be a dual purpose cable for use on both dual magnetron and single magnetron lamp systems. Even in single magnetron systems, electrical cable 18 eliminates the need to have a cable carrying high voltage to the magnetron and one or more additional separate cables carrying low voltage to the filament, blower, and/or sensors.

It is further appreciated that the blower 17 may be positioned outside of the lamp head 14 and be coupled by a conduit in fluid communication with an air inlet of the lamp head 14. Even in this arrangement, electrical cable 18 still eliminates the need for multiple cables to electrically couple the power supply 10 with the lamp head 14. In this instance, the outer conductors 34 are used to transfer power for energizing the filaments 26, 27 and to transfer signals between the power supply 10 and sensors 28, and the inner conductors 30 power the magnetrons 12, 13 (or single magnetron) with high voltage.

According to the principles of the invention, the number of cables extending between the power supply and lamp head is significantly reduced. In certain production lines, multiple different curing systems 16 may be located within a shared floorspace, so that reducing the number of cables becomes of even greater significance.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A lamp system for generating ultraviolet radiation, comprising:

a power supply;

a lamp head including a lamp capable of generating ultraviolet radiation when energized by microwave energy, a plurality of magnetrons supplying microwave energy to said lamp effective to excite a plasma in said lamp for generating ultraviolet radiation, and at least one low-voltage device; and a single electrical cable including a first set of conductors electrically coupling said power supply with said plurality of magnetrons and a second set of conductors electrically coupling said power supply with said at least one low-voltage device, said first set of conductors configured to carry a first voltage and said second set of conductors configured to carry a second voltage less than said first voltage.

2. The lamp system of claim 1 wherein said first voltage is less than about 10,000 DC Volts and said second voltage is less than about 300 AC Volts.

3. The lamp system of claim 1 wherein said first voltage is in the range of about 4,000 DC Volts to about 6,000 DC Volts.

4. The lamp system of claim 1 wherein said at least one low-voltage device is a blower.

5. The lamp system of claim 1 wherein said at least one low-voltage device is a sensor.

6. The lamp system of claim 5 wherein said sensor is selected from the group consisting of a light sensor and a pressure sensor.

7. The lamp system of claim 1 wherein said at least one low-voltage device is a filament of a corresponding one of said magnetrons.

8. The lamp system of claim 1 wherein said second voltage is less than about 300 AC Volts, and said low-voltage device is adapted to operate at less than about 300 AC Volts.

9. An electrical cable for a lamp system including a power supply, a lamp head having a lamp capable of generating ultraviolet radiation when energized by microwave energy, a plurality of magnetrons supplying microwave energy effective to excite a plasma in said lamp for generating ultraviolet radiation, and at least one low-voltage device, said electrical cable comprising:

a first set of conductors configured to carry a first voltage, said first set of conductors adapted for electrically coupling the power supply with the plurality of magnetrons; and a second set of conductors configured to carry a second voltage less than said first voltage, said second set of conductors adapted for electrically coupling the power supply with the at least one low-voltage device.

10. The electrical cable of claim 9 wherein said first voltage is less than about 10,000 DC Volts and said second voltage is less than about 300 AC Volts.

11. The electrical cable of claim 9 wherein said first voltage is in the range of about 4,000 DC Volts to about 6,000 DC Volts.

12. The electrical cable of claim 9 wherein said first set of conductors is positioned radially inward of said second set of conductors, and further comprising:

a first shield disposed radially between said first set of conductors and said second set of conductors.

13. The electrical cable of claim 12 further comprising:

a second shield disposed radially outward of said second set of conductors.

14. An electrical cable for a lamp system including a power supply, a lamp head having a lamp capable of generating ultraviolet radiation when energized by microwave energy, a plurality of magnetrons supplying microwave energy effective to excite a plasma in said lamp for generating ultraviolet radiation, and at least one low-voltage device, said electrical cable comprising:

a plurality of high-voltage conductors adapted to be electrically coupled with the plurality of magnetrons;

a plurality of low-voltage conductors adapted to be electrically coupled with the at least one low-voltage device;

an inner shield separating said plurality of high-voltage conductors from said plurality of low-voltage conductors; and an outer shield surrounding said plurality of low-voltage conductors.

15. The electrical connector of claim 14 wherein said plurality of high-voltage conductors are positioned in a first circular arrangement radially inside said inner shield and said plurality of low-voltage conductors are positioned in a second circular arrangement between said inner shield and said outer shield.

16. The electrical connector of claim 15 wherein said inner shield is positioned radially between said plurality of high-voltage conductors and said plurality of low-voltage conductors.

17. The electrical connector of claim 14 wherein said plurality of low-voltage conductors are more numerous than said plurality of high-voltage conductors.

* * * * *